(12) United States Patent
Castinado et al.

(10) Patent No.: US 11,756,098 B2
(45) Date of Patent: Sep. 12, 2023

(54) GEOGRAPHIC PREDICTIVE INDIRECT DISTRIBUTION NETWORK

(71) Applicant: BANK OF AMERICA CORPORATION, Charlotte, NC (US)

(72) Inventors: Joseph Benjamin Castinado, North Glenn, CO (US); Raveendra Ambulooru, Fort Mill, SC (US); Lee Ann Proud, Ponte Vedra, FL (US); Ann Ta, Scottsdale, AZ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 32 days.

(21) Appl. No.: 17/161,191

(22) Filed: Jan. 28, 2021

(65) Prior Publication Data
US 2022/0237683 A1    Jul. 28, 2022

(51) Int. Cl.
*G06Q 30/00* (2023.01)
*G06Q 30/0601* (2023.01)
*G06N 20/00* (2019.01)
*G06F 16/2455* (2019.01)

(52) U.S. Cl.
CPC ..... *G06Q 30/0631* (2013.01); *G06F 16/2455* (2019.01); *G06N 20/00* (2019.01); *G06Q 30/0629* (2013.01); *G06Q 30/0639* (2013.01)

(58) Field of Classification Search
CPC ................. G06Q 30/06–08; G06F 16/2455
See application file for complete search history.

(56) References Cited

U.S. PATENT DOCUMENTS

| | | | |
|---|---|---|---|
| 8,036,930 B2 | 10/2011 | Brignull et al. | |
| 8,306,846 B2 | 11/2012 | Tavares et al. | |
| 8,478,692 B2 | 7/2013 | Carlson et al. | |
| 8,620,738 B2 | 12/2013 | Fordyce, III et al. | |
| 8,732,042 B2 | 5/2014 | Hammad et al. | |
| 9,026,457 B2 | 5/2015 | Juang et al. | |
| 9,117,223 B1 | 8/2015 | Handel et al. | |
| 10,002,349 B2 | 6/2018 | Tavares et al. | |
| 10,552,849 B2 | 2/2020 | Mortimore, Jr. et al. | |
| 10,949,888 B1 | 3/2021 | Brock et al. | |
| 2008/0035725 A1* | 2/2008 | Jambunathan | G06Q 20/40 235/380 |
| 2008/0228582 A1 | 9/2008 | Fordyce et al. | |
| 2009/0240567 A1 | 9/2009 | Kinkead et al. | |

(Continued)

OTHER PUBLICATIONS

Google says machine learning is the future. So I tried it myself, Alex Hern Jun. 28, 2016; (Year: 2016).*

(Continued)

*Primary Examiner* — Kathleen Palavecino
(74) *Attorney, Agent, or Firm* — Moore & Van Allen PLLC; Nicholas C. Russell (57) ABSTRACT

Embodiments of the invention are directed to systems, methods, and computer program products for providing intelligent analysis of resource transfer data in order to identify potential customers to which a merchant has not sold, where the new group of potential customers has previously purchased goods and services similar to the goods and services offered by the merchant. The system may provide recommendations to the merchant for adjusting marketing and distribution strategies and may also provide an intelligent predictive analysis of increased sales volume and efficiency.

17 Claims, 5 Drawing Sheets

(56) References Cited

U.S. PATENT DOCUMENTS

| | | | |
|---|---|---|---|
| 2010/0106263 A1 | 4/2010 | Charania | |
| 2010/0161379 A1* | 6/2010 | Bene | G06Q 30/0202 |
| | | | 705/7.31 |
| 2011/0178843 A1 | 7/2011 | Rane et al. | |
| 2011/0178844 A1 | 7/2011 | Rane et al. | |
| 2011/0178845 A1 | 7/2011 | Rane et al. | |
| 2011/0178847 A1 | 7/2011 | Rane et al. | |
| 2011/0178855 A1 | 7/2011 | Rane et al. | |
| 2012/0124496 A1 | 5/2012 | Rose et al. | |
| 2012/0323631 A1 | 12/2012 | Bender et al. | |
| 2013/0110625 A1* | 5/2013 | Juang | G06Q 30/0255 |
| | | | 705/14.53 |
| 2013/0204663 A1* | 8/2013 | Kahlow | H04L 67/22 |
| | | | 705/7.31 |

OTHER PUBLICATIONS

Recommended For You: How machine learning helps you choose what to consume next, Jennifer Wei, Aug. 28, 2017; (Year: 2017).*

Machine Learning: What it is and why it matters, SAS, Jan. 7, 2014. (Year: 2014).*

Lassar, Walfried M., and Jeffrey L. Kerr. "Strategy and control in supplier-distributor relationships: An agency perspective." Strategic Management Journal 17.8 (1996): 613-632.*

* cited by examiner

GEOGRAPHIC PREDICTIVE INDIRECT DISTRIBUTION NETWORK

BACKGROUND

In some cases, merchants may be unaware of one or more localized demands for a given product or service offered by the merchant due to the nature of their current marketing strategies or current locations. Merchants may desire to expand their customer bases, but may also desire assurance that particular products or services will succeed in specific markets, geographic areas, or during specific time periods. As such a need exists for providing accurate and timely predictive data in order to aid or inform merchant decisions to expand their market potential and increase their customer base.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The systems and methods described herein address the above needs by providing intelligent analysis of transaction data to identify a new group of potential customers to which a merchant has not sold, where the new group of potential customers has previously purchased goods and services similar to the goods and services offered by the merchant. The system may provide recommendations to the merchant for adjusting marketing strategies or discounting prices to the new group of potential customers in a competitive manner. For example, if the merchant typically sells to customers in an eastern coastal market, and transaction data indicates that customers in a western coastal market also buy the goods or services offered by the merchant, the system may recommend that the merchant start marketing or discounting specific goods or services on the west coast, or in specific states, regions, towns, zip codes, countries, or the like. The system may also provide an intelligent predictive indication of a percentage increase of sales if a recommended marketing or discounting adjustment is made. Furthermore, the system may provide recommendations and cost data for logistics of delivering goods to the new group of potential customers. For example, if the merchant has a supplier or if the merchant could partner with a supplier closer to the west coast, the system may provide recommendations and cost data for using that supplier to provide goods to the new group of potential customers. The system may also provide trending information to merchants regarding types of goods that are being sold in geographic markets at particular times. For example, the purchasing of a specific good may increase in a specific region at a particular time of year, or the like.

Embodiments of the invention relate to systems, methods, and computer program products for geographic predictive indirect distribution, the invention including: receive a resource transfer dataset from a managing entity system, wherein the resource transfer dataset comprises data associated with a first resource transfer facilitated by the managing entity system, a geographic location of the first resource transfer, and one or more product identifiers associated with the first resource transfer; assign the resource transfer dataset to a category of dataset types, wherein an assigned category is selected from one or more of a plurality of predetermined categories; query a database for one or more datasets matching the assigned category and append the resource transfer dataset to the one or more datasets matching the assigned category, creating a combined dataset; process the combined dataset via a machine learning engine to identify an emerging trend in the assigned category for a particular geographic location; receive a merchant dataset from the managing entity system comprising merchant identifiers, merchant products, current merchant product distributors, and geographic locations of the merchant's current customer market for one or more merchants; process the merchant dataset via the machine learning engine to identify a subset of merchants of the one or more merchants as relevant to the emerging trend; and transmit a notification to the managing entity system, wherein the notification comprises information associated with the emerging trend and the subset of merchants.

In some embodiments, the system is further configured to, when processing the combined dataset via a machine learning engine, identify one or more product distributors for the particular geographic location.

In some embodiments, the system is further configured to, when assigning the resource transfer dataset to the category of dataset types, assign a similarity score to one or more of a plurality of predetermined categories.

In some embodiments, one or more merchants relevant to the emerging trend further comprise merchants with distributor relationships or product distribution access in the particular geographic location.

In some embodiments, the system is further configured to receive supplemental information from the managing entity system, wherein the supplemental information comprises data from a positioning system device associated with a user device and data from a managing entity application associated with the user device.

In some embodiments, the data associated with the first resource transfer comprises information identifying a merchant associated with the first resource transfer.

In some embodiments, the system is further configured to process the combined dataset via the machine learning engine to predict a future resource transfer by a user associated with the first resource transfer, and determine that the subset of merchants sells a product or service associated with the predicted future resource transfer.

In some embodiments, the system further comprises identifying a projected sales volume of products in the particular geographic location for a specific product based on the emerging trend, and wherein the notification further comprises a projected sales volume for each of the subset of merchants.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" or "managing entity" as used herein may refer to any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, or the like. The account is associated with and/or maintained by the entity. In other embodiments, an entity may not be a financial institution. In still other embodiments, the entity may be the merchant itself.

"Entity system" or "managing entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"User" as used herein may refer to an individual associated with an entity. As such, in some embodiments, the user may be an individual having past relationships, current relationships or potential future relationships with an entity. In some instances, a "user" is an individual who has a relationship with the entity, such as a customer or a prospective customer. Accordingly, as used herein the term "user device" or "mobile device" may refer to mobile phones, personal computing devices, tablet computers, wearable devices, and/or any portable electronic device capable of receiving and/or storing data therein and are owned, operated, or managed by a user.

"Transaction" or "resource transfer" as used herein may refer to any communication between a user and a third party merchant or individual to transfer funds for purchasing or selling of a product. A transaction may refer to a purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

The system allows for use of a machine learning engine to intelligently identify a new group of potential customers to which a merchant has not sold, where the new group of potential customers has previously purchased goods and services similar to the goods and services offered by the merchant. The machine learning engine may be used to analyze historical data and generate recommendations to the merchant for adjusting marketing strategies or discounting prices to the new group of potential customers. The machine learning engine may also be used to generate intelligent predictive indications of a percentage increase of sales if a recommended marketing or discounting adjustment is made. The system may provide the generated indications of the machine learning model to the merchant as recommendations and cost data for logistics of delivering goods to the new group of potential customers. In a similar fashion, the system may also provide trending information to merchants regarding types of goods that are being sold in geographic markets at particular times.

The managing entity may be in a uniquely situated position to gather relevant data and facilitate intelligent strategies for market expansion. Unlike a single merchant, the managing entity, such as a financial institution, may facilitate resource transfers between a large plurality of customers and a large plurality of merchants. By collecting data associated with each resource transfer, the system may identify data trends and generate predictions of future resource transfers for specific products independently of the merchant at which the future transfer may take place. In this way, the system may benefit a number of merchants, as well as managing entities, by providing product/service insights and data analysis that would not be obtainable by any one entity operating alone. The features and functions of the system will allow a managing entity to notify both the first and second merchant of this trend, enabling both merchants the ability to provide targeted advertisement and product recommendations to that customer at the appropriate time. Additionally, or alternatively, the system may employ data from a variety of sources to further refine transaction predictions, including but not limited to location-based service data and data captured during user/managing entity interactions other than resource transfers, such as activation of reward offers.

In some embodiments of the system, the system may identify customer trends or patterns relating to combinations of product categories and subcategories, certain geographical location, and certain time periods (e.g., certain years, seasons, months, or the like). For example, the system may determine that a customer purchases socks, belonging to an exemplary category of wool clothing, may be likely to purchase a product from a secondary category, such as outerwear in the same month, season, or the like. In this example, the system may prepare a report for a managing entity identifying this connection and the managing entity may distribute this information to one or more merchants which sell outerwear in one or more locations. In addition, the system may generate intelligent, accurate predictions of future profits the merchant may realize by nature of an existing relationship with a distributor in the area. For example, the system may determine that a particular merchant already has a relationship with a distributor in the area identified as having a customer demand for outerwear, and may identify that the merchant sells outerwear. In this example, the system may generate a recommendation to expand distribution of outerwear products to the identified geographic area where demand is known to exist and where the merchant has an existing distribution relationship.

Figure 1:
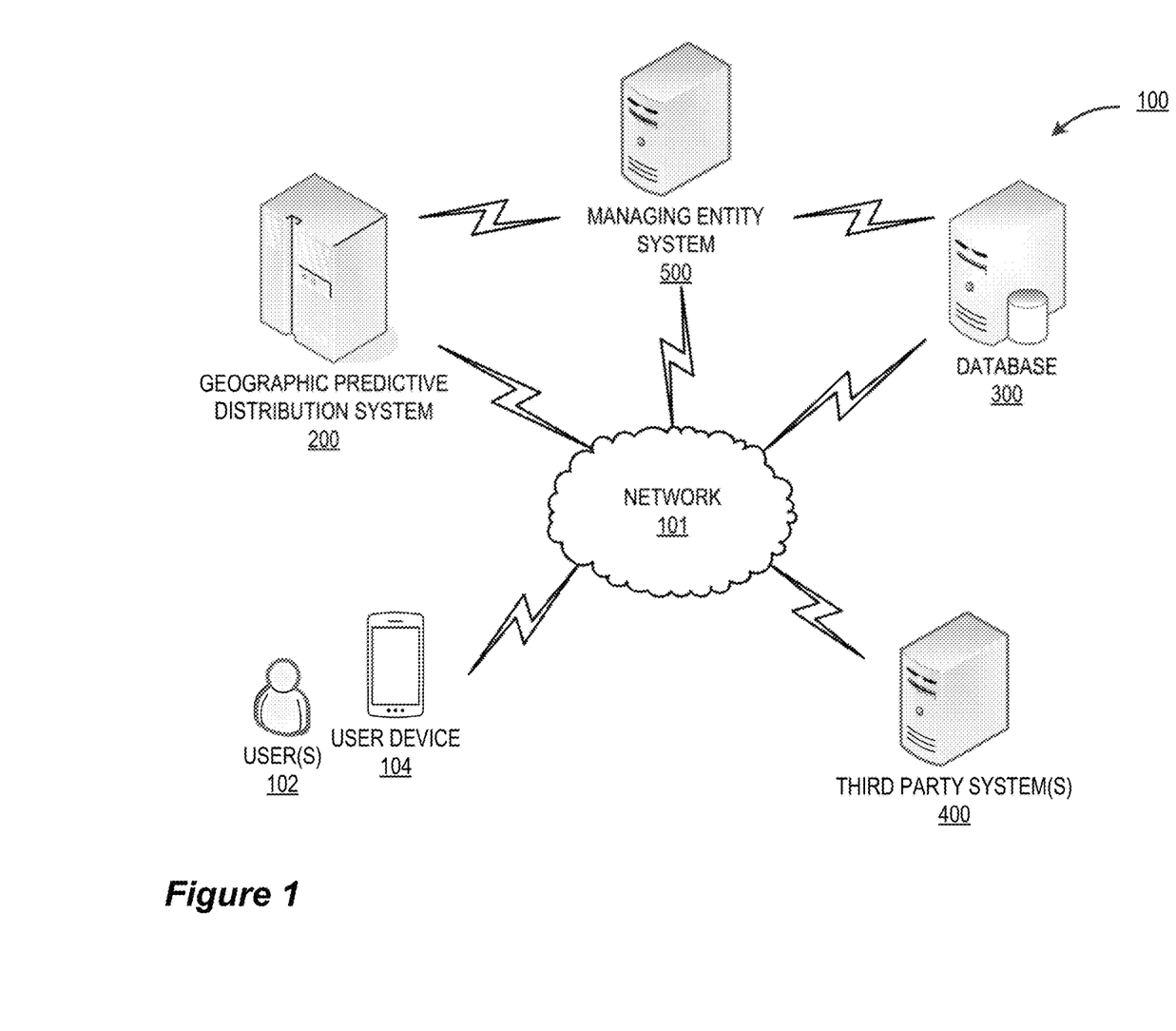
FIG. 1 illustrates an operating environment for the geographic predictive distribution system, in accordance with one embodiment of the present disclosure.

FIG. 1 illustrates an operating environment 100 for the geographic predictive distribution system, in accordance with one embodiment of the present disclosure. As illustrated, the operating environment 100 may comprise a user 102 and/or a user device 104 in operative communication with one or more third party systems 400 (e.g., third party merchant systems). The operative communication may occur via a network 101 as depicted, or the user 102 may be physically present at a location associated with the third party, such as a computer terminal or point-of-sale device located within a storefront. The operating environment also includes a managing entity system 500, a geographic predictive distribution system 200, a database 300, and/or other systems/devices not illustrated herein and connected via a network 101. As such, the user 102 may complete a resource transfer with the third party system 400 by establishing operative communication channels between the user device 104, the managing entity system 500, and the third party system 400 via a wireless network 101. In other embodiments, the user may complete a resource transfer with the third party system by interfacing directly with the third party system 400, which may then establish operative communication with the managing entity system 500 via a wireless network in order to execute the resource transfer.

Typically, the geographic predictive distribution system 200 and the database 300 are in operative communication with the managing entity system 500, via the network 101, which may be the internet, an intranet or the like. In FIG. 1, the network 101 may include a local area network (LAN), a wide area network (WAN), a global area network (GAN), and/or near field communication (NFC) network. The network 101 may provide for wireline, wireless, or a combination of wireline and wireless communication between devices in the network. In some embodiments, the network 101 includes the Internet. In some embodiments, the network 101 may include a wireless telephone network. Furthermore, the network 101 may comprise wireless communication networks to establish wireless communication channels such as a contactless communication channel and a near field communication (NFC) channel (for example, in the instances where communication channels are established between the user device 104 and the third party system 400). In this regard, the wireless communication channel may further comprise near field communication (NFC), communication via radio waves, communication through the internet, communication via electromagnetic waves and the like.

The user device 104 may comprise a mobile communication device, such as a cellular telecommunications device (i.e., a smart phone or mobile phone), a computing device such as a laptop computer, a personal digital assistant (PDA), a mobile internet accessing device, or other mobile device including, but not limited to portable digital assistants (PDAs), pagers, mobile televisions, laptop computers, cameras, video recorders, audio/video player, radio, GPS devices, any combination of the aforementioned, or the like. The user device is described in greater detail with respect to FIG. 3.

The managing entity system 500 may comprise a communication module and memory not illustrated, and may be configured to establish operative communication channels with a third party system 400 and/or a user device 104 via a network 101. The managing entity may comprise a user data repository which stores user account data. This data may be used by the managing entity to facilitate resource transfers between the user 102 or user device 104 and third party system 400. In some embodiments, the managing entity system is in operative communication with the geographic predictive distribution system 200 and database 300 via a private communication channel. The private communication channel may be via a network 101 or the geographic predictive distribution system 200 and database 300 may be fully integrated within the managing entity system 500.

As will be discussed in greater detail in FIG. 4 and FIG. 5, the managing entity system 500 may communicate with the geographic predictive distribution system 200 in order to transmit data associated with resource transfers between a plurality of users 102 and a plurality of third party systems 400. In some embodiments, the managing entity may utilize the features and functions of the geographic predictive distribution system to predict user behavior and anticipate future resource transfers. In other embodiments, the managing entity and/or the one or more third party systems may utilize the geographic predictive distribution system to react to identified trends in user behavior.

Figure 2:
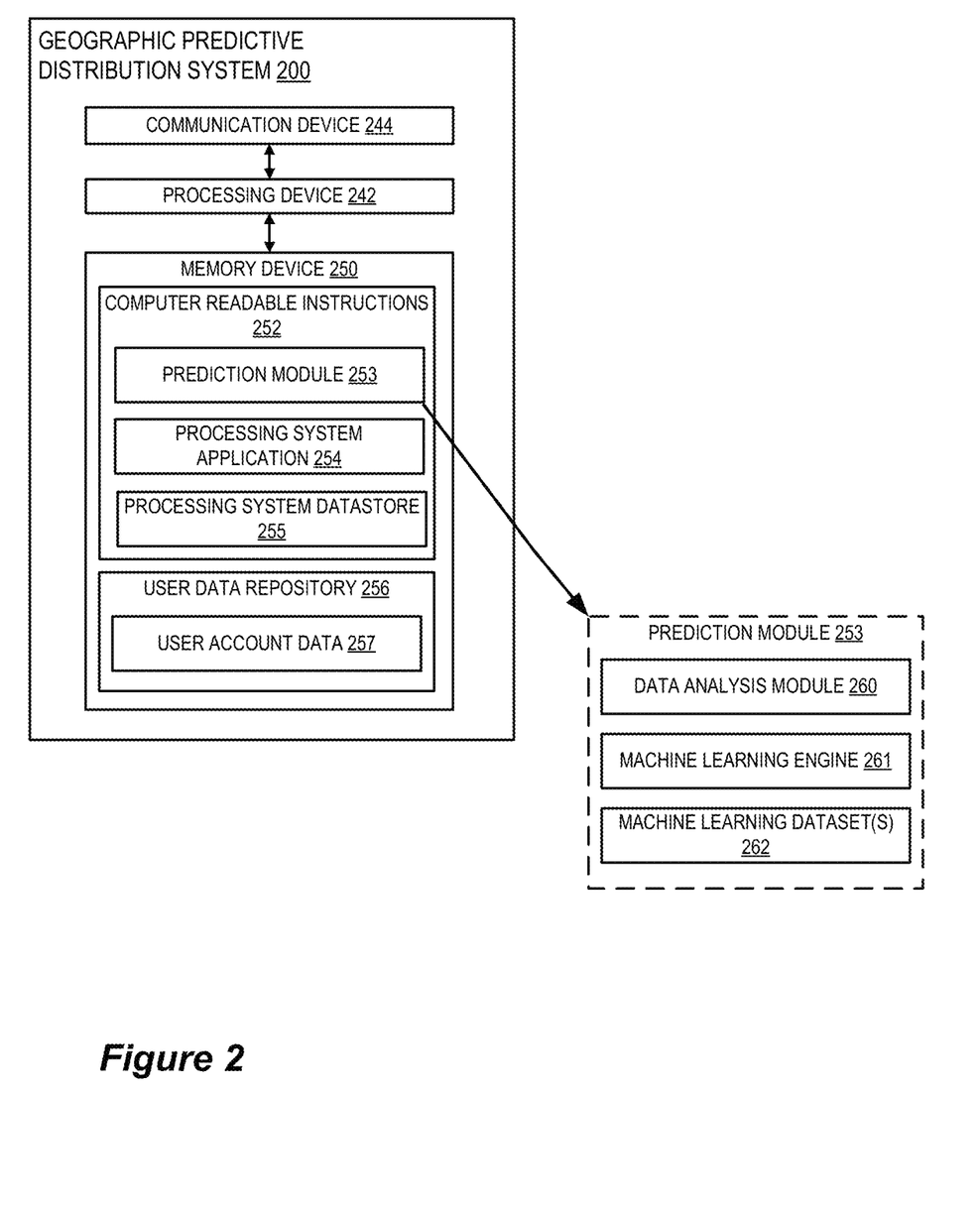
FIG. 2 is a block diagram illustrating the geographic predictive distribution system.

FIG. 2 illustrates a block diagram of the geographic predictive distribution system 200 associated with the operating environment 100, in accordance with embodiments of the present invention. As illustrated in FIG. 2, the geographic predictive distribution system 200 may include a communication device 244, a processing device 242, and a memory device 250 having a prediction application/module 253, a processing system application 254 and a processing system datastore 255 stored therein. As shown, the processing device 242 is operatively connected to and is configured to control and cause the communication device 244, and the memory device 250 to perform one or more functions. In some embodiments, the prediction module 253 and/or the processing system application 254 comprises computer readable instructions that when executed by the processing device 242 cause the processing device 242 to perform one or more functions and/or transmit control instructions to the database 300, the managing entity system 500, and/or the communication device 244. It will be understood that the prediction module 253 and/or the processing system application 254 may be executable to initiate, perform, complete, and/or facilitate one or more portions of any embodiments described and/or contemplated herein. The prediction module 253 may comprise executable instructions associated with data processing and analysis related to resource transfer data and may be embodied within the processing system application 254 in some instances. The geographic predictive distribution system 200 may be owned by, operated by and/or affiliated with the same managing entity that owns or operates the managing entity system 500. In some embodiments, the geographic predictive distribution system 200 is fully integrated within the managing entity system 500.

The prediction module 253 may further comprise a data analysis module 260, a machine learning engine 261, and a machine learning dataset(s) 262. The data analysis module 260 may store instructions and/or data that may cause or enable the geographic predictive distribution system 200 to receive, store, and/or analyze data received by the managing entity system 500 or the database 300. The data analysis module may process data to identify product categories and subcategories as will be further discussed in FIG. 4. The machine learning engine 261 and machine learning dataset(s) 262 may store instructions and/or data that cause or enable the geographic predictive distribution system 200 to determine, in real-time and based on received information, a projected trend or identified trend in user resource transfers related to a specific product, service, category of products or services. In some embodiments, the machine learning engine 261 and machine learning dataset(s) 262 may store instructions and/or data that cause or enable the geographic predictive distribution system 200 to determine, in real-time and based on received information, a recommended distribution plan or distribution parties recommended for one or more merchants to capitalize on identified product or service trends, which in some embodiments may be determined further using geographic data associated with one or more distributors, products, or product trends. The machine learning dataset(s) 262 may contain data queried from database 300 and/or may be based on historical data relating to a particular product category, user, third party merchant, or the like. The database 300 may also contain metadata related to particular resource transfers (e.g., product, location, time, day, year, or the like for which the resource transfer occurred). In some embodiments, the machine learning dataset(s) 262 may also contain data relating to user activity other than resource transfers as is further described herein.

The machine learning engine 261 may receive data from a plurality of sources and, using one or more machine learning algorithms, may generate one or more machine learning datasets 262. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. It is understood that additional or alternative machine learning algorithms may be used without departing from the invention.

Figure 3:
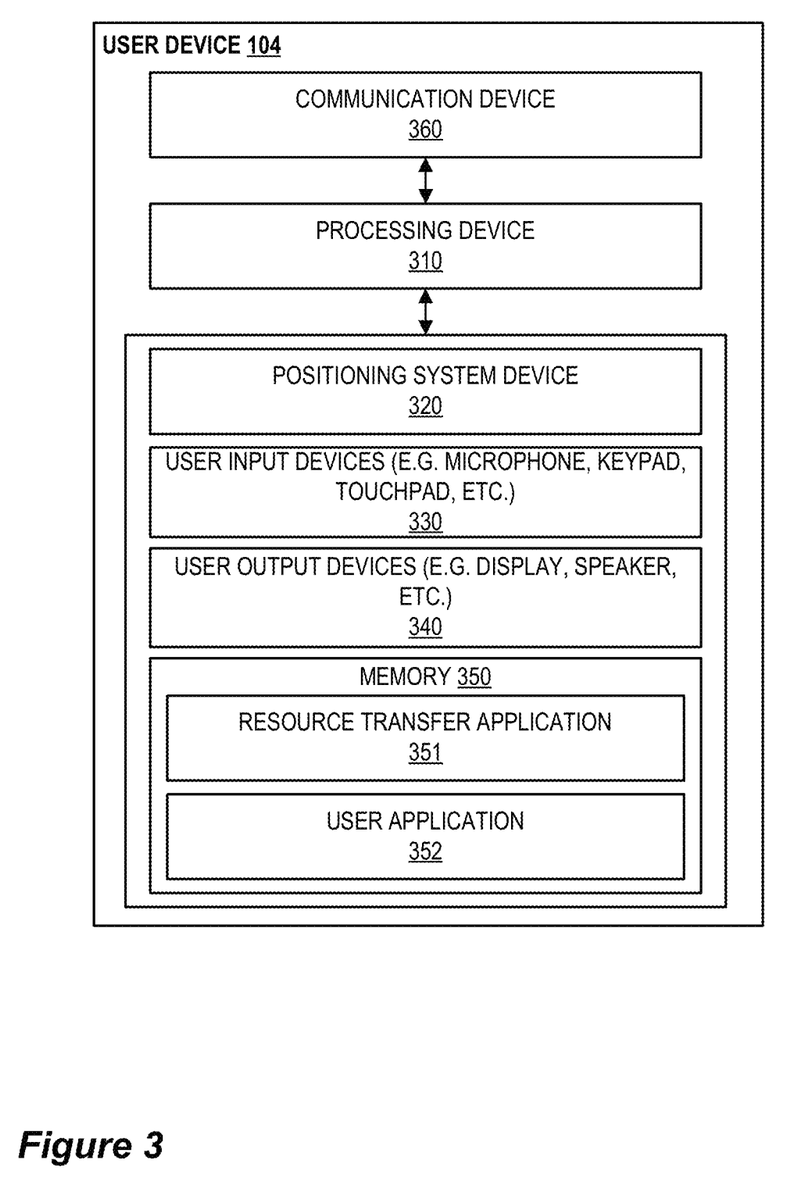
FIG. 3 is a block diagram illustrating a user device associated with the geographic predictive distribution system.

The machine learning datasets 262 may include machine learning data linking one or more details of a resource transfer (e.g. product category or subcategory, location purchased, merchant identifier, or the like) with a time and/or day or date of the transfer to identify one or more patterns or sequences of transfers that may aid in predicting one or more future transfers by the same user or by another user with a similar transaction history. For instance, the machine learning datasets 262 may include data linking a particular purchase of a given product on a particular date to an additional purchase of a second, related product on another particular date. Thus, this data may enable the geographic predictive distribution system 200 to predict a likely future transfer between a user and a third party. The data associated with a resource transfer may be supplemented by additional data obtained from an interaction between the user device 104 and the managing entity system 500. For example, in some embodiments, the system may determine, based on location data obtained from a positioning system 320 of a user device 104, that a user is in closer proximity to a first third party merchant than a second third party merchant. The geographic predictive distribution system 200 may weight that information accordingly to determine that the predicted resource transfer is more likely to occur at the first third party merchant than the second third party merchant. Additionally or alternatively, the system may determine, based on information obtained from a user application 352 of a user device 104, that a user is interested in or intending to interact with a particular third party merchant. As with location-based data, the geographic predictive distribution system 200 may weight the information to determine that the predicted resource transfer is more likely to occur at a third party merchant if a user has indicated interest in that particular third party merchant. In some embodiments, the weighting of information to determine that the predicted resource transfer is more likely to occur at the third party merchant may be extrapolated from the product category information. For instance, the machine learning dataset 262 may indicate that the user has purchased a number of winter-related products, and extrapolate predicted resource transfers for other related products not already purchased by the user. In other embodiments, the machine learning dataset 262 may indicate a number of similar users that may make similar purchases, or may identify a specific trend in purchasing over a set of users sharing similar characteristics or in a certain geographic region.

The communication device 244 may generally include a modem, server, transceiver, and/or other devices for communicating with other devices on the network 101. The communication device 244 may be a communication interface having one or more communication devices configured to communicate with one or more other devices on the network 101, such as the geographic predictive distribution system 200, the user device 104, other processing systems, data systems, etc.

Additionally, referring to geographic predictive distribution system 200 illustrated in FIG. 2, the processing device 242 may generally refer to a device or combination of devices having circuitry used for implementing the communication and/or logic functions of the geographic predictive distribution system 200. For example, the processing device 242 may include a control unit, a digital signal processor device, a microprocessor device, and various analog-to-digital converters, digital-to-analog converters, and other support circuits and/or combinations of the foregoing. Control and signal processing functions of the geographic predictive distribution system 200 may be allocated between these processing devices according to their respective capabilities. The processing device 242 may further include functionality to operate one or more software programs based on computer-executable program code 252 thereof, which may be stored in a memory device 250, such as the processing system application 254 and the prediction module 253. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. The processing device 242 may be configured to use the network communication interface of the communication device 244 to transmit and/or receive data and/or commands to and/or from the other devices/systems connected to the network 101.

The memory device 250 within the geographic predictive distribution system 200 may generally refer to a device or combination of devices that store one or more forms of computer-readable media for storing data and/or computer-executable program code/instructions. For example, the memory device 250 may include any computer memory that provides an actual or virtual space to temporarily or permanently store data and/or commands provided to the processing device 242 when it carries out its functions described herein.

FIG. 3 illustrates a block diagram of the user device associated with the geographic predictive distribution system, in accordance with embodiments of the present invention. The user device 104 may include a user mobile device or the like. A user device or "mobile device" 104 may be any mobile communication device, such as a cellular telecommunications device (i.e., a cell phone or mobile phone), personal digital assistant (PDA), a mobile Internet accessing device, or another mobile device including, but not limited to portable digital assistants (PDAs), pagers, mobile televisions, laptop computers, cameras, video recorders, audio/video player, radio, GPS devices, any combination of the aforementioned devices.

The user device 104 may generally include a processing device or processor 310 communicably coupled to devices such as, a memory device 350, user output devices 340 (for example, a user display or a speaker), user input devices 330 (such as a microphone, keypad, touchpad, touch screen, and the like), a communication device or network interface device 360, a positioning system device 320, such as a geo-positioning system device like a GPS device, an accelerometer, and the like, one or more chips, and the like.

The processor 310 may include functionality to operate one or more software programs or applications, which may be stored in the memory device 320. For example, the processor 310 may be capable of operating applications such as a resource transfer application 351, a user application or merchant application 352, or a web browser application. The resource transfer application may then allow the user device 104 to transmit and receive data and instructions to or from the third party system 400 and the user application 352 may allow the user device 104 to transmit and receive data to or from the managing entity system 500 (for example, via wireless communication or NFC channels), data and instructions to or from the geographic predictive distribution system 200, web content, such as, for example, location-based content and/or other web page content, according to a Wireless Application Protocol (WAP), Hypertext Transfer Protocol (HTTP), and/or the like. The user application 352 may allow the managing entity 500 to present the user 102 with a plurality of recommendations, identified trends, suggestions, resource transfer data, pattern data, geographic data, statistics, and/or the like for the user.

The processor 310 may be configured to use the communication device 360 to communicate with one or more devices on a network 101 such as, but not limited to the third party system 400 and the managing entity system 500. In this regard the processor 310 may be configured to provide signals to and receive signals from the communication device 360. The signals may include signaling information in accordance with the air interface standard of the applicable BLE standard, cellular system of the wireless telephone network and the like, that may be part of the network 101. In this regard, the user device 104 may be configured to operate with one or more air interface standards, communication protocols, modulation types, and access types. By way of illustration, the user device 104 may be configured to operate in accordance with any of a number of first, second, third, and/or fourth-generation communication protocols and/or the like. For example, the user device 104 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The user device 104 may also be configured to operate in accordance with non-cellular communication mechanisms, such as via a wireless local area network (WLAN) or other communication/data networks. The user device 104 may also be configured to operate in accordance Bluetooth® low energy, audio frequency, ultrasound frequency, or other communication/data networks.

The communication device 360 may also include a user activity interface presented in user output devices 340 in order to allow a user 102 to execute some or all of the processes described herein. The application interface may have the ability to connect to and communicate with an external data storage on a separate system within the network 101. The user output devices 340 may include a display (e.g., a liquid crystal display (LCD) or the like) and a speaker 334 or other audio device, which are operatively coupled to the processor 310. The user input devices 330, which may allow the user device 104 to receive data from the user 102, may include any of a number of devices allowing the user device 104 to receive data from a user 102, such as a keypad, keyboard, touch-screen, touchpad, microphone, mouse, joystick, other pointer device, button, soft key, and/or other input device(s).

The user device 104 may also include a memory buffer, cache memory or temporary memory device 350 operatively coupled to the processor 310. Typically, one or more applications 351 and 352, are loaded into the temporarily memory during use. As used herein, memory may include any computer readable medium configured to store data, code, or other information. The memory device 350 may include volatile memory, such as volatile Random Access Memory (RAM) including a cache area for the temporary storage of data. The memory device 420 may also include non-volatile memory, which can be embedded and/or may be removable. The non-volatile memory may additionally or alternatively include an electrically erasable programmable read-only memory (EEPROM), flash memory or the like.

In some instances, various features and functions of the invention are described herein with respect to a "system." In some instances, the system may refer to the geographic predictive distribution system 200 performing one or more steps described herein in conjunction with other devices and systems, either automatically based on executing computer readable instructions of the memory device 250, or in response to receiving control instructions from the managing entity system 500. In some instances, the system refers to the devices and systems on the operating environment 100 of FIG. 1. The features and functions of various embodiments of the invention are be described below in further detail.

It is understood that the servers, systems, and devices described herein illustrate one embodiment of the invention. It is further understood that one or more of the servers, systems, and devices can be combined in other embodiments and still function in the same or similar way as the embodiments described herein.

Figure 4:
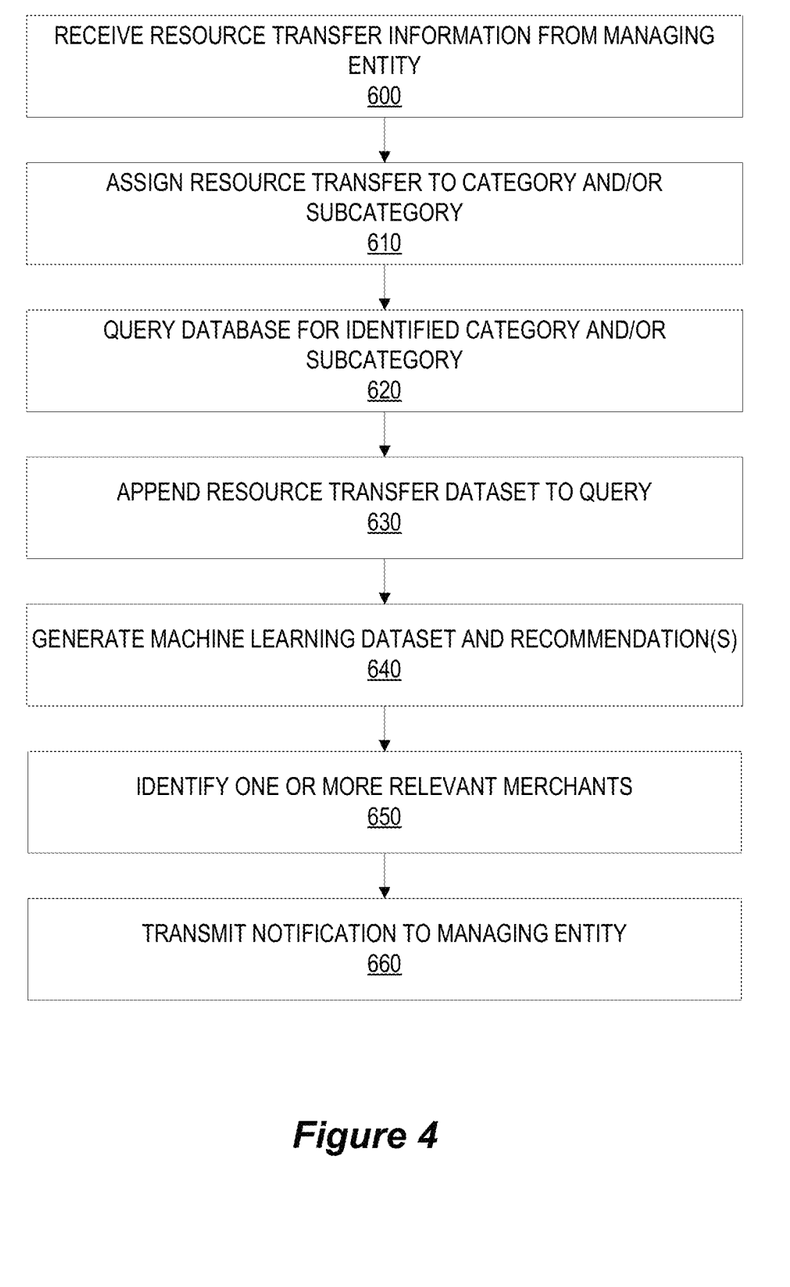
FIG. 4 is a flow diagram illustrating a process using the geographic predictive distribution system, in accordance with one embodiment of the present disclosure.

FIG. 4 is a high-level process flow diagram illustrating a process using the geographic predictive distribution system, in accordance with one embodiment of the present disclosure. The process begins at block 600, where the system receives a data packet from a managing entity system 500 containing resource transfer information. The resource transfer information contained within the data packet may include but is not limited to data such as time, location, description of the product/service, resource amount, resource instrument or account used to complete the transfer, information identifying the merchant or third party, and/or information identifying the user or customer. In some embodiments the system may receive a unique data packet after the occurrence of an individual transfer, or in other embodiments the managing entity may choose to group data packets together and transfer the information after a predetermined amount of time, such as once per day. In some embodiments, the system may also receive data from the positioning system device 320 and the user application 352 of the user device 104. This data may include information such as user proximity to one or more third party systems, user proximity to third party merchants, user proximity to distributors, or may be categorized more broadly according to region, country, state, township, zip code or the like.

The process may then continue to block 610, wherein for each individual resource transfer, the system assigns a product/service category and/or subcategory to the resource transfer information set (e.g., via the data analysis module 260). In some embodiments, the categories may be assigned based on a calculated similarity score to one of a plurality of predetermined categories associated with the merchant identified in the resource transfer. The process may then continue to block 620, wherein the system may query the database 300 for datasets related to, in some embodiments, the same user and product category, or a similar user (e.g., according to some user characteristic such as residency, past purchase history, interests, years of life, or the like). In some embodiments, the system may query for a larger selection of users, such as users within a particular geographic area or the like. The system may then append the resource transfer dataset to the queried data 630 and process the combined data via the machine learning engine 261.

In block 640 of FIG. 4, the output of the machine learning engine is a newly generated machine learning dataset 262. The machine learning engine may conduct real-time, iterative, cognitive analysis of the resource transfer data and the combined data extracted from the database, or otherwise received by the managing entity, merchants, or the like, in order to further identify resource transfer patterns, merchant recommendations, or the like. It is understood that the machine learning engine utilizes an iterative process which is constantly improved in accuracy based on available data. It is understood that the use of iterative machine learning create multiple models using received data, and may periodically alter or re-select best or most accurate model(s) for resource transfer pattern recognition or helpful merchant recommendation. For instance, the machine learning engine 146 may adapt to patterns previously not identified by nature of emergent patterns in a new year, season, region, or the like.

In some embodiments, the machine learning engine utilizes a plurality of neural network models which are compared and selected, or combined to produce the most accurate pattern recognition or predictive capability based on available data. In this way, an ensemble of models may be used to achieve the most accurate predictive results, and the ensemble may be adapted over time as needed. The machine learning engine may comprise a supervised or unsupervised machine learning model, or ensemble of models, in order to process incoming data in order to generate recommendations or recognize patterns in a dynamic fashion using a neural network architecture. The machine learning engine is configured to process a collection of data received by or stored on the system, which provides a wealth of available training data allowing the system to develop a high level of adaptability to constantly changing environments or a wide array of various system conditions, external application needs, node statuses, user permissions, or the like, as may be reflected in changes in a received data stream in real time. In some embodiments, the machine learning engine may include an adversarial neural network. For example, transformer-based, attention-based, and bi-directional Long Short Term Memory (LSTM) Deep learning based network models may be used for encoding and decoding for pattern detection and classification of resource transfers. This method incorporates the use of encoding and decoding in order to train one or more machine learning models and identify relevant patterns in received data from one or more channels of communication or extracted from merchant data history. In some embodiments, different ensembles of similar machine learning models with different training characteristics may be combined to achieve a desired result or accuracy in data processing.

The dataset generated by the machine learning model may enable the system to predict a likely future resource transfer between a user and a third party, or may inform a recommendation to one or more merchants to focus on a particular area or region for selling products or services. The system may identify one or more merchants who sell relevant products or services in a particular area, as shown in block 650. In block 660 of FIG. 4, the system may transmit a notification to the managing entity system, wherein the notification may contain predictions generated by the geographic predictive distribution system 200. In some embodiments, the system may transmit this notification in the form of a regularly generated report. Additionally, or alternatively, the system may transmit this notification in response to a query from the managing entity.

Figure 5:
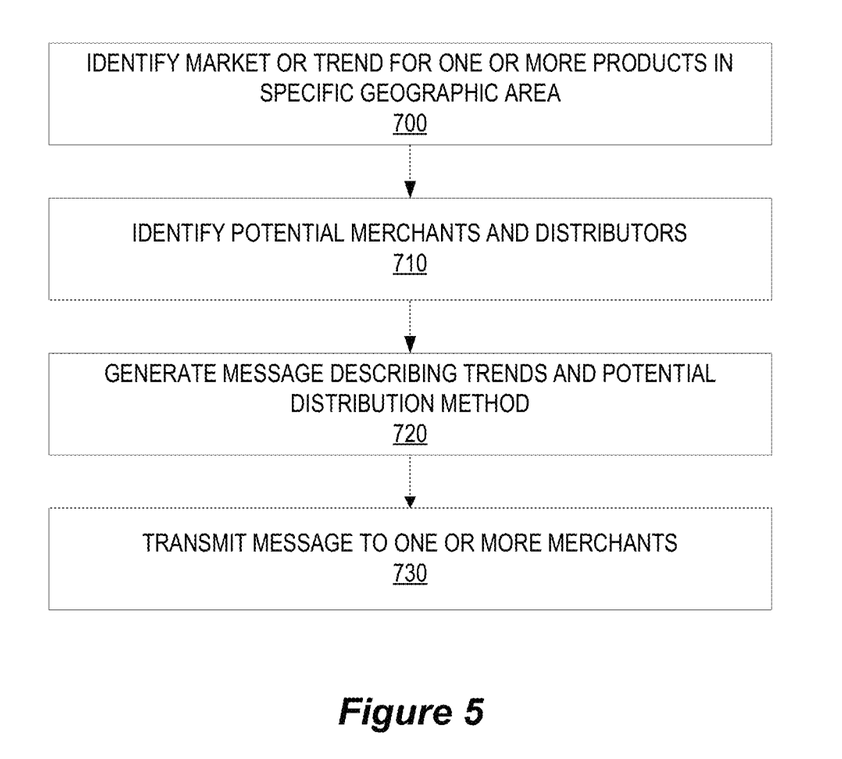
FIG. 5 is a flow diagram illustrating a process using the geographic predictive distribution system, in accordance with another embodiment of the present disclosure.

FIG. 5 is a high-level process flow diagram illustrating a process using the geographic predictive distribution system, in accordance with another embodiment of the present disclosure. The process begins at block 700, wherein the system identifies a market or emerging trend for a particular product in a specific geographic area (e.g., region, country, state, township, zip code, or the like). As previously discussed, the system may utilize the machine learning engine 261 to determine demand for a particular product in the specific geographic region based on user historical data, the historical data of similar users, merchant data, historical data of similar merchants, and/or the like. The system may then query the database 300 to determine a list of one or more merchants that may offer the specific products or services identified as trending, as shown in block 710. In some embodiments, the system may query for all merchants which have sold the identified product/service in the past, merchants that the user has engaged with previously, merchants in a particular geographic location, and/or some combination of like information. In some embodiments, the system may also receive or store data related to the merchant's distribution methods and relationships. For instance, the merchant may have an existing relationship with the managing entity, such as a business account, or the like, and may have an account history indicating a relationship with a particular product distributor or distribution method. In some embodiments, the system may use additional information from the positioning system device 320 of the user device 104 to identify distributors in close proximity to the merchant, or may analyze the distribution methods of merchants in the specific geographic area where the system has identified a trend or pattern of resource transfers. The system may utilize the machine learning engine 261 to calculate the degree to which the additional information may influence the list of potential merchants and then weight the list according to the probability of each merchant being selected for the recommendation.

The process continues in block 720, wherein the system may generate a message or data packet containing details of the identified trends and potential recommendations for distribution methods. The message may contain information such as the product/service to be offered, a predicted time and/or location of the offer, information identifying the volume of products currently purchased in the area or expected to be purchased in the area, and/or the list of potential competing merchants determined in block 710. In some embodiments, the message may contain information such as specific distributors in the specific area which the potential merchant may use to ship products. In some embodiments, the message may comprise multiple reports which the managing entity system may then distribute to individual third party systems or merchants, wherein each report contains only information identifying a single third party merchant. The process is completed in block 730, wherein the system transmits that message to one or more merchants.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for geographically-specific predictive distribution recommendations, the system comprising:
   at least one non-transitory storage device; and
   at least one processing device coupled to the at least one non-transitory storage device, wherein the at least one processing device is configured to:
   receive a resource transfer dataset from a managing entity system, wherein the resource transfer dataset comprises data associated with a first resource transfer facilitated by the managing entity system, a geographic location of the first resource transfer, and one or more product identifiers associated with the first resource transfer;
   assign the resource transfer dataset to a category of dataset types, wherein an assigned category is selected from one or more of a plurality of predetermined categories;
   query a database for one or more datasets matching the assigned category and append the resource transfer dataset to the one or more datasets matching the assigned category, creating a combined dataset;
   process the combined dataset via a machine learning engine to identify an emerging trend in the assigned category for a particular geographic location, wherein processing the combined dataset via the machine learning engine further comprises:
   linking a purchase of a product on a first date to an additional purchase of a second, related product on second date, wherein the first product and the second products further comprise consumer goods;
   identifying that the purchase and the additional purchase were each conducted in the same geographic region; and
   based on the product and the related product being correlated to a particular season, generating a prediction that a third purchase will occur in the same geographic region;
   receive a merchant dataset from the managing entity system comprising merchant identifiers, merchant products, current merchant product distributors, and geographic locations of the merchant's current customer market for one or more merchants;
   process the merchant dataset via the machine learning engine to identify a subset of merchants of the one or more merchants as previously selling the product and the related product relevant to the emerging trend;
   further identify the subset of merchants based on the subset of merchants having existing distributor relationships in the particular geographic region, wherein the existing distributor relationships comprise specific distributors in the particular geographic area that the subset of merchants utilize to ship products; and
   transmit a notification to the managing entity system, wherein the notification comprises information associated with the emerging trend and the subset of merchants.

2. The system of claim 1, wherein the at least one processing device is further configured to, when processing the combined dataset via a machine learning engine, identify one or more product distributors for the particular geographic location.

3. The system of claim 1, wherein the at least one processing device is further configured to, when assigning the resource transfer dataset to the category of dataset types, assign a similarity score to one or more of a plurality of predetermined categories.

4. The system of claim 1, wherein the at least one processing device is further configured to receive supplemental information from the managing entity system, wherein the supplemental information comprises data from a positioning system device associated with a user device and data from a managing entity application associated with the user device.

5. The system of claim 1, wherein the data associated with the first resource transfer comprises information identifying a merchant associated with the first resource transfer.

6. The system of claim 1, wherein the at least one processing device is further configured to process the combined dataset via the machine learning engine to predict a future resource transfer by a user associated with the first resource transfer, and determine that the subset of merchants sells a product or service associated with the predicted future resource transfer.

7. The system of claim 1, further comprising identifying a projected sales volume of products in the particular geographic location for a specific product based on the emerging trend, and wherein the notification further comprises a projected sales volume for each of the subset of merchants.

8. A computer program product for geographically-specific predictive distribution recommendations, the computer program product comprising at least one non-transitory computer-readable medium having computer-readable program code portions embodied therein, the computer-readable program code portions comprising:
   an executable portion configured for receiving a resource transfer dataset from a managing entity system, wherein the resource transfer dataset comprises data associated with a first resource transfer facilitated by the managing entity system, a geographic location of the first resource transfer, and one or more product identifiers associated with the first resource transfer;
   an executable portion configured for assigning the resource transfer dataset to a category of dataset types, wherein an assigned category is selected from one or more of a plurality of predetermined categories;

an executable portion configured for querying a database for one or more datasets matching the assigned category and appending the resource transfer dataset to the one or more datasets matching the assigned category, creating a combined dataset;

an executable portion configured for processing the combined dataset via a machine learning engine to identify an emerging trend in the assigned category for a particular geographic location, wherein processing the combined dataset via the machine learning engine further comprises:

linking a purchase of a product on a first date to an additional purchase of a second, related product on second date, wherein the first product and the second products further comprise consumer goods;

identifying that the purchase and the additional purchase were each conducted in the same geographic region; and based on the product and the related product being correlated to a particular season, generating a prediction that a third purchase will occur in the same geographic region;

an executable portion configured for receiving a merchant dataset from the managing entity system comprising merchant identifiers, merchant products, current merchant product distributors, and geographic locations of the merchant's current customer market for one or more merchants;

an executable portion configured for processing the merchant dataset via the machine learning engine to identify a subset of merchants of the one or more merchants as previously selling the product and the related product relevant to the emerging trend;

further identify the subset of merchants based on the subset of merchants having existing distributor relationships in the particular geographic region, wherein the existing distributor relationships comprise specific distributors in the particular geographic area that the subset of merchants utilize to ship products; and an executable portion configured for transmitting a notification to the managing entity system, wherein the notification comprises information associated with the emerging trend and the subset of merchants.

9. The computer program product of claim 8, wherein the at least one processing device is further configured to, when processing the combined dataset via a machine learning engine, identify one or more product distributors for the particular geographic location.

10. The computer program product of claim 8, wherein the at least one processing device is further configured to, when assigning the resource transfer dataset to the category of dataset types, assign a similarity score to one or more of a plurality of predetermined categories.

11. The computer program product of claim 8, wherein the at least one processing device is further configured to receive supplemental information from the managing entity system, wherein the supplemental information comprises data from a positioning system device associated with a user device and data from a managing entity application associated with the user device.

12. The computer program product of claim 8, wherein the data associated with the first resource transfer comprises information identifying a merchant associated with the first resource transfer.

13. The computer program product of claim 8, wherein the at least one processing device is further configured to process the combined dataset via the machine learning engine to predict a future resource transfer by a user associated with the first resource transfer, and determine that the subset of merchants sells a product or service associated with the predicted future resource transfer.

14. The computer program product of claim 8, further comprising identifying a projected sales volume of products in the particular geographic location for a specific product based on the emerging trend, and wherein the notification further comprises a projected sales volume for each of the subset of merchants.

15. A computer-implemented method for geographically-specific predictive distribution recommendations, the method comprising:

providing a computing system comprising a computer processing device and a non-transitory computer readable medium, wherein the computer readable medium comprises configured computer program instruction code, such that when said instruction code is operated by said computer processing device, said computer processing device performs the following operations:

receiving a resource transfer dataset from a managing entity system, wherein the resource transfer dataset comprises data associated with a first resource transfer facilitated by the managing entity system, a geographic location of the first resource transfer, and one or more product identifiers associated with the first resource transfer;

assigning the resource transfer dataset to a category of dataset types, wherein an assigned category is selected from one or more of a plurality of predetermined categories;

querying a database for one or more datasets matching the assigned category and appending the resource transfer dataset to the one or more datasets matching the assigned category, creating a combined dataset;

processing the combined dataset via a machine learning engine to identify an emerging trend in the assigned category for a particular geographic location, wherein processing the combined dataset via the machine learning engine further comprises:

linking a purchase of a product on a first date to an additional purchase of a second, related product on second date, wherein the first product and the second products further comprise consumer goods;

identifying that the purchase and the additional purchase were each conducted in the same geographic region; and based on the product and the related product being correlated to a particular season, generating a prediction that a third purchase will occur in the same geographic region;

receiving a merchant dataset from the managing entity system comprising merchant identifiers, merchant products, current merchant product distributors, and geographic locations of the merchant's current customer market for one or more merchants;

processing the merchant dataset via the machine learning engine to identify a subset of merchants of the one or more merchants as previously selling the product and the related product relevant to the emerging trend;

further identifying the subset of merchants based on the subset of merchants having existing distributor relationships in the particular geographic region, wherein the existing distributor relationships comprise specific distributors in the particular geographic area that the subset of merchants utilize to ship products; and transmitting a notification to the managing entity system, wherein the notification comprises information associated with the emerging trend and the subset of merchants.

16. The computer-implemented method of claim 15, wherein the at least one processing device is further configured to, when processing the combined dataset via a machine learning engine, identify one or more product distributors for the particular geographic location.

17. The computer-implemented method of claim 15, further comprising identifying a projected sales volume of products in the particular geographic location for a specific product based on the emerging trend, and wherein the notification further comprises a projected sales volume for each of the subset of merchants.

* * * * *